(12) United States Patent
Misawa (10) Patent No.: US 10,097,043 B2
(45) Date of Patent: *Oct. 9, 2018

(54) CONTACTLESS POWER TRANSMISSION DEVICE AND POWER TRANSFER SYSTEM

(71) Applicant: TOYOTA JIDOSHA KABUSHIKI KAISHA, Toyota-shi, Aichi-ken (JP)

(72) Inventor: Takahiro Misawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

This patent is subject to a terminal disclaimer.

(21) Appl. No.: 15/177,932

(22) Filed: Jun. 9, 2016

(65) Prior Publication Data

US 2017/0025899 A1 Jan. 26, 2017

(30) Foreign Application Priority Data

Jul. 21, 2015 (JP) .................................. 2015-143938

(51) Int. Cl.
| | |
|---|---|
| H02J 50/12 | (2016.01) |
| H02J 7/04 | (2006.01) |
| H02J 7/02 | (2016.01) |
| H02M 3/337 | (2006.01) |
| H02M 1/00 | (2006.01) |

(52) U.S. Cl.
CPC .............. *H02J 50/12* (2016.02); *H02J 7/025* (2013.01); *H02M 3/3376* (2013.01); *H02M 2001/0025* (2013.01); *H02M 2001/0051* (2013.01); *H02M 2001/0058* (2013.01); *Y02B 70/1491* (2013.01)

(58) Field of Classification Search
CPC ............ H02J 7/025; H02J 7/045; H02J 50/10; H02M 1/32; H02M 7/04; H02M 1/42; H02M 1/12; H02M 7/44
USPC ................................................ 307/104, 131
See application file for complete search history.

(56) References Cited

U.S. PATENT DOCUMENTS

| | | | |
|---|---|---|---|
| 7,741,734 | B2 | 6/2010 | Joannopoulos et al. |
| 2007/0222542 | A1 | 9/2007 | Joannopoulos et al. |
| 2008/0278264 | A1 | 11/2008 | Karalis et al. |

(Continued)

FOREIGN PATENT DOCUMENTS

| | | |
|---|---|---|
| AU | 2006269374 B2 | 1/2007 |
| AU | 2007349874 A2 | 10/2008 |

(Continued)

OTHER PUBLICATIONS

Feb. 7, 2018 Office Action issued in U.S. Appl. No. 15/153,385.
Jun. 18, 2018 Notice of Allowance issued in U.S. Appl. No. 15/153,385.

*Primary Examiner* — Jared Fureman
*Assistant Examiner* — Michael Warmflash
(74) *Attorney, Agent, or Firm* — Oliff PLC (57) ABSTRACT

A control unit executes a first control and a second control. The first control is to control transmission power to target power by adjusting a duty of an output voltage of an inverter. The second control is to control a turn-on current by adjusting the drive frequency, the turn-on current indicating an output current of the inverter at a rising of the output voltage. When the transmission power exceeds a limit value larger than the target power during adjustment of the drive frequency by the second control, the control unit decreases the target power in the first control.

6 Claims, 7 Drawing Sheets

(56) References Cited

U.S. PATENT DOCUMENTS

| | | |
|---|---|---|
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0020879 A1* | 1/2013 | Kihara .................... H02J 5/005 307/104 |
| 2013/0024046 A1* | 1/2013 | Toriya .................... H02J 5/005 700/297 |
| 2013/0127409 A1 | 5/2013 | Ichikawa |
| 2013/0193749 A1 | 8/2013 | Nakamura et al. |
| 2013/0248520 A1 | 9/2013 | Uchida et al. |
| 2014/0265615 A1 | 9/2014 | Kim et al. |
| 2015/0008877 A1 | 1/2015 | Ichikawa et al. |
| 2015/0028691 A1 | 1/2015 | Yamauchi et al. |
| 2015/0061580 A1* | 3/2015 | Yamakawa ............. H02J 50/80 320/108 |
| 2016/0064951 A1 | 3/2016 | Yamamoto et al. |
| 2016/0344236 A1 | 11/2016 | Misawa |

FOREIGN PATENT DOCUMENTS

| | | |
|---|---|---|
| AU | 2010200044 A1 | 1/2010 |
| AU | 2006269374 C1 | 3/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 103262648 A | 8/2013 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2009-501510 A | 1/2009 |
| JP | 2013-074685 A | 4/2013 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2013-192326 A | 9/2013 |
| JP | 2014-207795 A | 10/2014 |
| JP | 2015-095915 A | 5/2015 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2015/015771 A1 | 2/2015 |

* cited by examiner

CONTACTLESS POWER TRANSMISSION DEVICE AND POWER TRANSFER SYSTEM

This nonprovisional application is based on Japanese Patent Application No. 2015-143938 filed on Jul. 21, 2015 with the Japan Patent Office, the entire contents of which are hereby incorporated by reference.

BACKGROUND OF THE INVENTION

Field of the Invention

The present invention relates to a contactless power transmission device and a power transfer system, and particularly to a power control technique in a contactless power transmission device that transmits electric power to a power reception device in a contactless manner.

Description of the Background Art

Japanese Patent Laying-Open No. 2014-207795 discloses a contactless power feeding system that supplies electric power from a power feeding device (power transmission device) to a vehicle (power reception device) in a contactless manner. In this contactless power feeding system, the power feeding device includes a power transmission coil, an inverter and a control unit. The power transmission coil transmits electric power to the power reception coil mounted on the vehicle in a contactless manner. The inverter produces an AC current in accordance with a drive frequency for output to the power transmission coil. The control unit obtains a charging power command for a battery and output power for the battery from the vehicle side, and controls by feedback the drive frequency of the inverter such that the output power follows the charging power command.

When the inverter is a voltage-source inverter and supplies transmission power in accordance with the drive frequency to the power transmission unit, transmission power can be controlled by adjusting the duty of an inverter output voltage. By adjusting the drive frequency of the inverter, a turn-on current indicating an inverter output current at the rising of the inverter output voltage can be controlled.

For a power transmission device, a limit value can be placed on transmission power so as not to exceed a target value significantly. When such a limit value is placed, the transmission power needs to be maintained at a value less than or equal to the limit value.

When the drive frequency of the inverter is adjusted for controlling a turn-on current, the transmission power changes with the change in the drive frequency. When the transmission power changes with the adjustment of the drive frequency, the transmission power may exceed a limit value unexpectedly. For example, in the situation where the coupling coefficient between a power transmission coil and a power reception coil is small and the transmission power is small, changes in the transmission power tend to be large with respect to changes in the drive frequency. When the drive frequency of the inverter is adjusted, an overshoot of the transmission power may occur, so that the transmission power may exceed the limit value unexpectedly. Japanese Patent Laying-Open No. 2014-207795 mentioned above does not particularly discuss such a problem in that the transmission power exceeds a limit value unexpectedly and a solution thereof.

SUMMARY OF THE INVENTION

It is therefore an object of the present invention to provide a contactless power transmission device that transmits electric power to a power reception device in a contactless manner which prevents transmission power from exceeding a limit value when the drive frequency of an inverter is adjusted.

It is another object of the present invention to provide a power transfer system that transmits electric power from a power transmission device to a power reception device in a contactless manner which prevents transmission power from exceeding a limit value when the drive frequency of an inverter of the power transmission device is adjusted.

According to the present invention, a contactless power transmission device includes a power transmission unit, a voltage-source inverter and a control unit. The power transmission unit is configured to transmit electric power to a power reception device in a contactless manner. The voltage-source inverter supplies transmission power to the power transmission unit in accordance with a drive frequency. The control unit controls the inverter. The control unit is configured to execute a first control and a second control. The first control is to control the transmission power to target power by adjusting a duty of an output voltage of the inverter (transmission power control). The second control is to control a turn-on current by adjusting the drive frequency, the turn-on current indicating an output current of the inverter at a rising of the output voltage (turn-on current control). When the transmission power exceeds a limit value larger than the target power during adjustment of the drive frequency by the second control, the control unit is configured to decrease the target power in the first control.

Moreover, according to the present invention, a power transfer system includes a power transmission device and a power reception device. The power transmission device includes a power transmission unit, a voltage-source inverter and a control unit. The power transmission unit is configured to transmit electric power to the power reception device in a contactless manner. The voltage-source inverter supplies transmission power to the power transmission unit in accordance with a drive frequency. The control unit controls the inverter. The control unit is configured to execute a first control (transmission power control) and a second control (turn-on current control). When the transmission power exceeds a limit value larger than the target power during adjustment of the drive frequency by the second control, the control unit is configured to decrease the target power in the first control.

In the above aspects of the present invention, the target power is decreased when the transmission power exceeds the limit value. With the decrease of the target power, the transmission power is decreased. Therefore, the transmission power can be prevented from exceeding the limit value.

Preferably, when the transmission power exceeds the limit value during adjustment of the drive frequency by the second control, the control unit is configured to decrease the target power by subtracting a correction amount proportional to an excess amount of the transmission power over the limit value from the target power.

With such a configuration, the transmission power exceeding the limit value can be reduced quickly with a simple configuration.

Preferably, the control unit is configured to decrease the target power by further subtracting a correction amount proportional to an integrated value of the excess amount from the target power.

With such a configuration, when the transmission power exceeds the limit value, the transmission power is limited to the limit value. It is therefore possible to prevent the transmission power from exceeding the limit value with reliability and to minimize the amount of decrease of the target power.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described in detail with reference to the drawings. In the drawings, the same or corresponding portions have the same reference characters allotted, and description thereof will not be repeated.

(Configuration of Power Transfer System)

Figure 1:
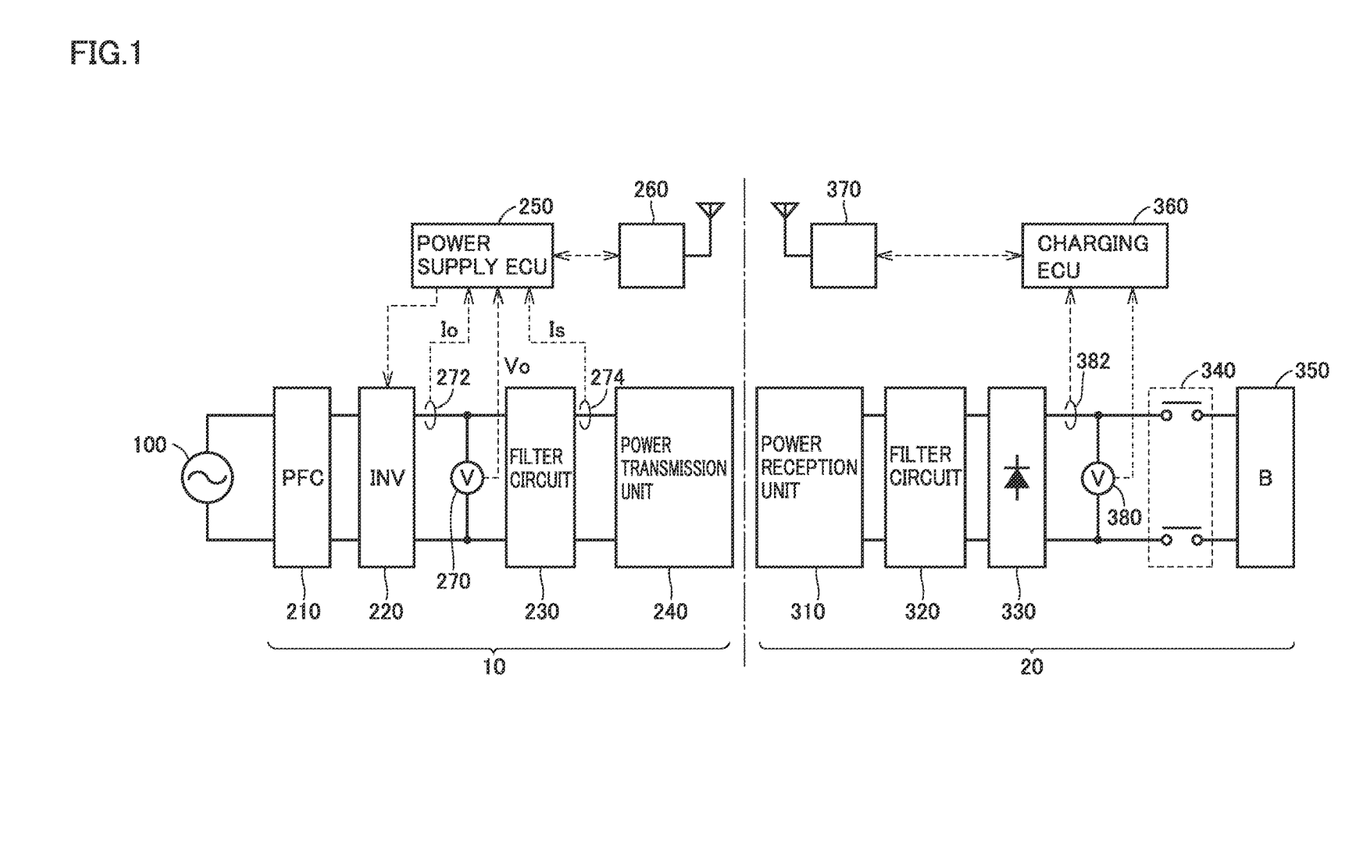
FIG. 1 shows an overall configuration of a power transfer system according to an embodiment.

FIG. 1 shows an overall configuration of a power transfer system to which a contactless power transmission device according to an embodiment of the present invention is applied. Referring to FIG. 1, this power transfer system includes a power transmission device 10 and a power reception device 20. Power reception device 20 may be mounted on a vehicle or the like that can travel using electric power supplied from power transmission device 10 and stored therein, for example.

Power transmission device 10 includes a power factor correction (PFC) circuit 210, an inverter 220, a filter circuit 230, and a power transmission unit 240. Power transmission device 10 further includes a power supply ECU (Electronic Control Unit) 250, a communication unit 260, a voltage sensor 270, and current sensors 272, 274.

PFC circuit 210 can rectify and boost AC power received from an AC power supply 100 (e.g., system power supply) for supply to inverter 220 and can bring an input current close to a sine wave, thereby correcting the power factor. Any of publicly known various PFC circuits can be adopted as this PFC circuit 210. Instead of PFC circuit 210, a rectifier without the power factor correcting function may be adopted.

Inverter 220 converts DC power received from PFC circuit 210 into transmission power (AC) having a predetermined transmission frequency. The transmission power produced by inverter 220 is supplied to power transmission unit 240 through filter circuit 230. Inverter 220 is a voltage-source inverter, in which a freewheel diode is connected in antiparallel to each of switching elements that constitute inverter 220. Inverter 220 is implemented by a single-phase full bridge circuit, for example.

Filter circuit 230 is provided between inverter 220 and power transmission unit 240, and suppresses a harmonic noise caused by inverter 220. Filter circuit 230 is implemented by an LC filter including an inductor and a capacitor, for example.

Power transmission unit 240 receives AC power (transmission power) having a transmission frequency from inverter 220 through filter circuit 230, and transmits the electric power in a contactless manner to a power reception unit 310 of power reception device 20 through an electromagnetic field produced around power transmission unit 240. Power transmission unit 240 includes a resonant circuit for transmitting electric power to power reception unit 310 in a contactless manner, for example. Although the resonant circuit may be composed of a coil and a capacitor, the capacitor may be omitted when a desired resonant state is achieved only with the coil.

Voltage sensor 270 detects an output voltage of inverter 220, and outputs a detected value to power supply ECU 250. Current sensor 272 detects an output current of inverter 220, and outputs a detected value to power supply ECU 250. Based on the detected values of voltage sensor 270 and current sensor 272, transmission power supplied from inverter 220 to power transmission unit 240 (i.e., electric power output from power transmission unit 240 to power reception device 20) may be detected. Current sensor 274 detects a current flowing in power transmission unit 240, and outputs a detected value to power supply ECU 250.

For detection of transmission power, current sensor 274 may be used instead of current sensor 272, or transmission power may be calculated by detecting a voltage and a current on a DC line between PFC circuit 210 and inverter 220.

Power supply ECU 250, including a CPU (Central Processing Unit), a memory device, an input/output buffer, and the like (neither shown), receives signals from various sensors and devices, and controls various devices in power transmission device 10. As an example, power supply ECU 250 exerts switching control of inverter 220 such that inverter 220 produces transmission power (AC) when power transmission from power transmission device 10 to power reception device 20 is executed. Various types of controls are not limited to processing by software, but may be processed by dedicated hardware (an electronic circuit).

As main control executed by power supply ECU 250, power supply ECU 250 executes feedback control (hereinafter also referred to as "transmission power control") for controlling transmission power to target power when power transmission from power transmission device 10 to power reception device 20 is executed. Specifically, power supply ECU 250 controls transmission power to target power by adjusting the duty of an output voltage of inverter 220. The duty of an output voltage is defined as a ratio of a positive (or negative) voltage output time period to the cycle of an output voltage waveform (square wave). The duty of an inverter output voltage can be adjusted by changing the operating timing of the switching elements of inverter 220 (on/off duty: 0.5). Target power may be produced based on the power reception state of power reception device 20, for example. In this embodiment, power reception device 20 produces target power for transmission power based on a difference between a target value and a detected value of received power, and transmits the target power to power transmission device 10.

Power supply ECU 250 executes feedback control for controlling a turn-on current in inverter 220 to a target value (hereinafter also referred to as "turn-on current control") while executing the above-described transmission power control. Specifically, power supply ECU 250 controls the turn-on current to the target value by adjusting the drive frequency (switching frequency) of inverter 220. The turn-on current is an instantaneous value of the output current of inverter 220 at the rising of the output voltage of inverter 220. If the turn-on current has a positive value, a reverse recovery current flows into the freewheel diodes of inverter 220, causing heat generation, namely, losses, in the freewheel diodes. Therefore, the above-described target value for the turn-on current control (turn-on current target value) is set to fall within the range where a recovery current is not produced in the freewheel diodes of inverter 220, and is basically set at a predetermined value of less than or equal to 0 ("0" at which the power factor is improved is ideal, but a negative value may also be selected affording a margin, or the turn-on current target value may be set at a positive value which is small enough to such a degree that losses caused by a recovery current are negligible).

In power transmission device 10 according to this embodiment, a limit value is placed on transmission power to be transmitted by power transmission unit 240 such that the transmission power does not exceed a target value significantly. The limit value on transmission power is a value larger than the target value. The limit value on transmission power is, for example, a value larger than the target value of the transmission power by a predetermined ratio, and is set based on the performance of power transmission device 10 and power reception device 20, and the like. Power supply ECU 250 decreases target power in the transmission power control if transmission power from power transmission unit 240 exceeds a limit value during adjustment of the drive frequency of the inverter by the turn-on current control. The transmission power control including this adjustment of target power and the turn-on current control will be described later in detail.

Communication unit 260 is configured to make wireless communications with a communication unit 370 of power reception device 20, and receives a target value for transmission power (target power) transmitted from power reception device 20, and also exchanges information including the start/stop of power transmission, the power reception state of power reception device 20, and the like with power reception device 20.

On the other hand, power reception device 20 includes power reception unit 310, a filter circuit 320, a rectification unit 330, a relay circuit 340, and a power storage device 350. Power reception device 20 further includes a charging ECU 360, communication unit 370, a voltage sensor 380, and a current sensor 382.

Power reception unit 310 receives electric power (AC) output from power transmission unit 240 of power transmission device 10 in a contactless manner. Power reception unit 310 includes a resonant circuit for receiving electric power from power transmission unit 240 in a contactless manner, for example. Although the resonant circuit may be composed of a coil and a capacitor, the capacitor may be omitted when a desired resonant state is achieved only with the coil. Power reception unit 310 outputs received power to rectification unit 330 through filter circuit 320.

Filter circuit 320 is provided between power reception unit 310 and rectification unit 330, and suppresses a harmonic noise produced at the time of power reception. Filter circuit 320 is implemented by an LC filter including an inductor and a capacitor, for example. Rectification unit 330 rectifies AC power received by power reception unit 310 for output to power storage device 350.

Power storage device 350 is a rechargeable DC power supply, and is implemented by a secondary battery, such as a lithium-ion battery or a nickel-metal hydride battery, for example. Power storage device 350 stores electric power output from rectification unit 330. Power storage device 350 then supplies the stored electric power to a load driving device or the like not shown. A large-capacity capacitor can also be adopted as power storage device 350.

Relay circuit 340 is provided between rectification unit 330 and power storage device 350, and is turned on when power storage device 350 is charged by power transmission device 10. Although not particularly shown, a DC/DC converter that adjusts an output voltage of rectification unit 330 may be provided between rectification unit 330 and power storage device 350 (e.g., between rectification unit 330 and relay circuit 340).

Voltage sensor 380 detects an output voltage (a voltage of received power) of rectification unit 330, and outputs the detected value to charging ECU 360. Current sensor 382 detects an output current (a current of received power) from rectification unit 330, and outputs the detected value to charging ECU 360. Based on the detected values of voltage sensor 380 and current sensor 382, electric power received by power reception unit 310 (i.e., charging power for power storage device 350) can be detected. Received power may be detected by detecting a voltage and a current on a power line between power reception unit 310 and filter circuit 320 or a power line between filter circuit 320 and rectification unit 330.

Charging ECU 360, including a CPU, a memory device, an input/output buffer, and the like (neither shown), receives signals from various sensors and devices, and controls various devices in power reception device 20. Various types of controls are not limited to processing by software, but may be processed by dedicated hardware (an electronic circuit).

As main control executed by charging ECU 360, during power reception from power transmission device 10, charging ECU 360 produces a target value for transmission power (target power) in power transmission device 10 such that received power in power reception device 20 attains a desired target value. Specifically, charging ECU 360 produces the target value for transmission power in power transmission device 10 based on the difference between the detected value and the target value for received power. Charging ECU 360 then transmits the produced target value for transmission power (target power) to power transmission device 10 through communication unit 370.

Communication unit 370 is configured to make wireless communications with communication unit 260 of power transmission device 10, and transmits the target value for transmission power (target power) produced in charging ECU 360 to power transmission device 10, exchanges information on the start/stop of power transmission with power transmission device 10, and transmits the power reception state of power reception device 20 (a voltage of received power, a current of received power, received power, etc.) to power transmission device 10.

Figure 2:
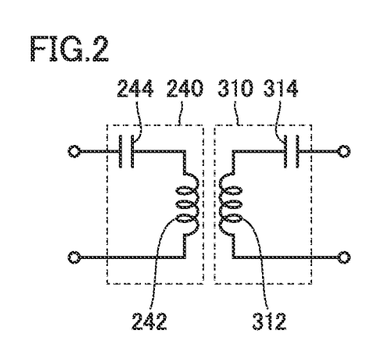
FIG. 2 illustrates an example of a circuit configuration of a power transmission unit and a power reception unit.

FIG. 2 illustrates an example of a circuit configuration of power transmission unit 240 and power reception unit 310 shown in FIG. 1. Referring to FIG. 2, power transmission unit 240 includes a coil 242 and a capacitor 244. Capacitor 244 is provided to compensate for the power factor of transmission power, and is connected in series with coil 242. Power reception unit 310 includes a coil 312 and a capacitor 314. Capacitor 314 is provided to compensate for the power factor of received power, and is connected in series with coil 312. Such a circuit configuration is also called an SS (primary series-secondary series) arrangement.

Although not particularly shown, the configuration of power transmission unit 240 and power reception unit 310 is not limited to that of the SS arrangement. For example, an SP (primary series-secondary parallel) arrangement with which capacitor 314 is connected in parallel with coil 312 in power reception unit 310 may be adopted, or a PP (primary parallel-secondary parallel) arrangement with which capacitor 244 is further connected in parallel with coil 242 in power transmission unit 240 may be adopted.

Referring again to FIG. 1, in this power transfer system, transmission power (AC) is supplied from inverter 220 to power transmission unit 240 through filter circuit 230. Power transmission unit 240 and power reception unit 310 each include a coil and a capacitor, and are designed to resonate at a transmission frequency. The Q factor indicating the resonance strength of power transmission unit 240 and power reception unit 310 is preferably more than or equal to 100.

In power transmission device 10, when transmission power is supplied from inverter 220 to power transmission unit 240, energy (electric power) is transferred from power transmission unit 240 to power reception unit 310 through an electromagnetic field formed between the coil of power transmission unit 240 and the coil of power reception unit 310. The energy (electric power) transferred to power reception unit 310 is supplied to power storage device 350 through filter circuit 320 and rectification unit 330.

Figure 3:
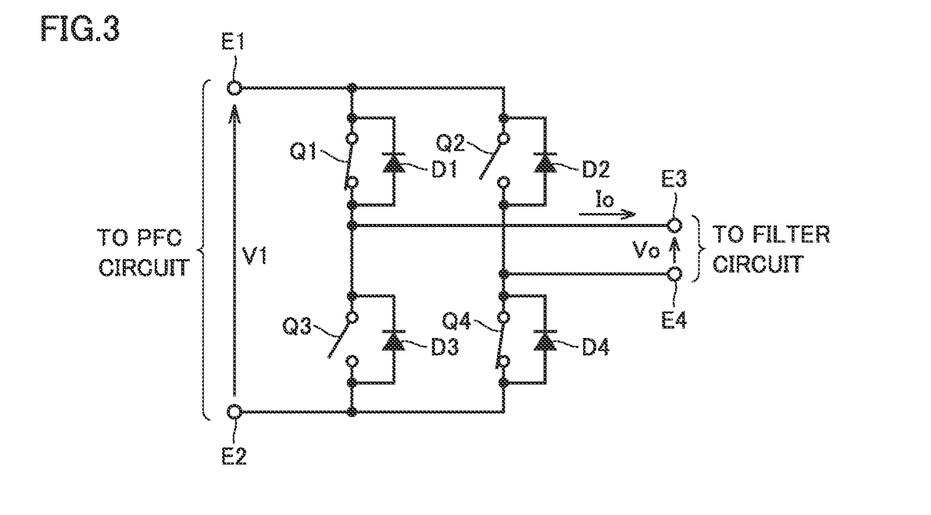
FIG. 3 illustrates a circuit configuration of an inverter.

FIG. 3 illustrates a circuit configuration of inverter 220 shown in FIG. 1. Referring to FIG. 3, inverter 220 is a voltage-source inverter, and includes power semiconductor switching elements (hereinafter briefly referred to as "switching elements" as well) Q1 to Q4 and freewheel diodes D1 to D4. PFC circuit 210 (FIG. 1) is connected to terminals E1 and E2 on the DC side, and filter circuit 230 is connected to terminals E3 and E4 on the AC side.

Switching elements Q1 to Q4 are implemented by, for example, IGBTs (Insulated Gate Bipolar Transistors), bipolar transistors, MOSFETs (Metal Oxide Semiconductor Field Effect Transistors), GTOs (Gate Turn Off thyristors), or the like. Freewheel diodes D1 to D4 are connected in antiparallel to switching elements Q1 to Q4, respectively.

A DC voltage V1 output from PFC circuit 210 is applied across terminal E1 and E2. Following the switching operation of switching elements Q1 to Q4, output voltage Vo and output current Io are produced across terminals E3 and E4 (the direction indicated by each arrow in the figure shall indicate a positive value). This FIG. 3 shows, as an example, a state where switching elements Q1 and Q4 are on, and switching elements Q2 and Q3 are off. Output voltage Vo in this case is substantially equal to voltage V1 (positive value).

Figure 4:
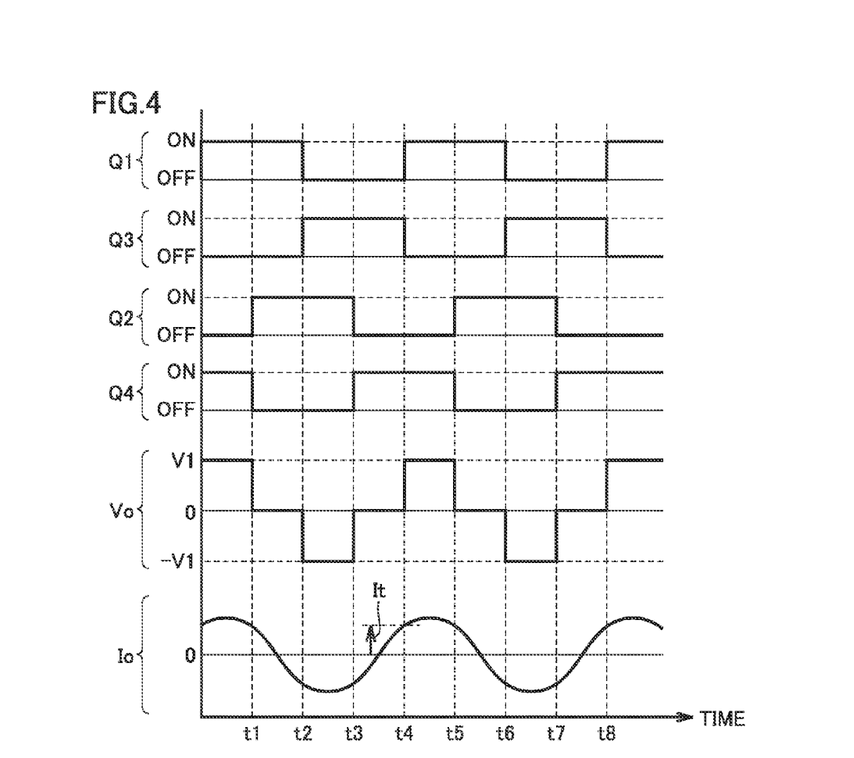
FIG. 4 illustrates switching waveforms of the inverter as well as waveforms of an output voltage Vo and an output current Io.

FIG. 4 illustrates switching waveforms of inverter 220 as well as waveforms of output voltage Vo and output current Io. Referring to FIG. 3 along with FIG. 4, one cycle from time t4 to time t8 will be described by way of example. At time t4, with switching elements Q2 and Q4 being off and on, respectively, switching element Q1 is switched from off to on, and switching element Q3 is switched from on to off (the state shown in FIG. 3). Then, output voltage Vo of inverter 220 rises from 0 to V1 (positive value).

At time t5, with switching elements Q1 and Q3 being on and off, respectively, switching element Q2 is switched from off to on, and switching element Q4 is switched from on to off. Then, output voltage Vo becomes 0.

At time t6, with switching elements Q2 and Q4 being on and off, respectively, switching element Q1 is switched from on to off, and switching element Q3 is switched from off to on. Then, output voltage Vo becomes −V1 (negative value).

At time t7, with switching elements Q1 and Q3 being off and on, respectively, switching element Q2 is switched from on to off, and switching element Q4 is switched from off to on. Then, output voltage Vo recovers to 0.

Then, at time t8 after one cycle from time t4, with switching elements Q2 and Q4 being off and on, respectively, switching element Q1 is switched from off to on, and switching element Q3 is switched from on to off. Then, output voltage Vo rises from 0 to V1 (positive value) (the state identical to that of time t4).

FIG. 4 shows the case where the duty of output voltage Vo is 0.25. The duty of output voltage Vo can be changed by changing the switching timing of switching elements Q1, Q3 and that of switching elements Q2 and Q4. For example, when the switching timing of switching elements Q2 and Q4 is expedited relative to the case shown in FIG. 4, the duty of output voltage Vo can be made lower than 0.25 (0 at minimum), and when the switching timing of switching elements Q2 and Q4 is delayed, the duty of output voltage Vo can be made higher than 0.25 (0.5 at maximum).

Transmission power can be changed by adjusting this duty of output voltage Vo. Qualitatively, transmission power can be increased by increasing the duty, and can be reduced by decreasing the duty. Therefore, in this embodiment, power supply ECU 250 executes transmission power control for controlling transmission power to target power by adjusting the duty of output voltage Vo.

An instantaneous value It of output current Io at the rising of output voltage Vo (time t4 and time t8) is equivalent to the above-described turn-on current. The value of this turn-on current It varies with voltage V1 supplied to inverter 220 from PFC circuit 210 or the drive frequency (switching frequency) of inverter 220. Shown here is the case where positive turn-on current It flows.

When positive turn-on current It flows, a reverse current, namely, a recovery current, flows into freewheel diode D3 (FIG. 3) connected in antiparallel to switching element Q3. When the recovery current flows into freewheel diode D3, heat generation in freewheel diode D3 increases, causing increase in losses in inverter 220. If turn-on current It is less than or equal to 0, a recovery current does not flow into freewheel diode D3, which suppresses losses in inverter 220.

Since turn-on current It changes when the drive frequency (switching frequency) of inverter 220 changes, turn-on current It can be controlled by adjusting the drive frequency of inverter 220. Therefore, in this embodiment, power supply ECU 250 executes the turn-on current control for controlling turn-on current It to a target value by adjusting the drive frequency of inverter 220. The target value for turn-on current It is basically set at a value of less than or equal to 0 such that a recovery current is not produced in inverter 220.

Referring again to FIG. 1, in this embodiment, transmission power supplied from inverter 220 to power transmission unit 240 is controlled to the target power by adjusting the duty of the output voltage of inverter 220 as described above (transmission power control). Moreover, the turn-on current is controlled to a target value of less than or equal to 0 by adjusting the drive frequency (switching frequency) of inverter 220 such that a recovery current is not produced in inverter 220 (turn-on current control).

Here, in the course of adjusting the drive frequency of inverter 220 to search for a desired inverter operating point, transmission power from power transmission unit 240 may exceed a limit value. For example, in the situation where the coupling coefficient between coils 242 and 312 is small and the transmission power is small, changes in the transmission power with respect to changes in the drive frequency of inverter 220 tend to be large. When the drive frequency of inverter 220 is adjusted to control the turn-on current, the transmission power may exceed the limit value unexpectedly.

If control is exerted for reducing the duty of the output voltage of inverter 220 when the transmission power has exceeded the limit value, the transmission power will be reduced at that moment. However, when the drive frequency of inverter 220 is adjusted further, the transmission power may exceed the limit value again. Therefore, when the transmission power has exceeded the limit value, the transmission power cannot be sufficiently prevented from exceeding the limit value merely by reducing the duty of the output voltage of inverter 220.

Thus, in power transmission device 10 according to this embodiment, power supply ECU250 decreases the target power in the transmission power control if the transmission power transmitted by power transmission unit 240 has exceeded the limit value during the adjustment of the drive frequency of inverter 220 by the turn-on current control. Accordingly, the transmission power can be decreased to prevent the transmission power from exceeding the limit value. The transmission power control and the turn-on current control executed by power supply ECU250 will be described below in detail.

(Transmission Power Control and Turn-On Current Control)

Figure 5:
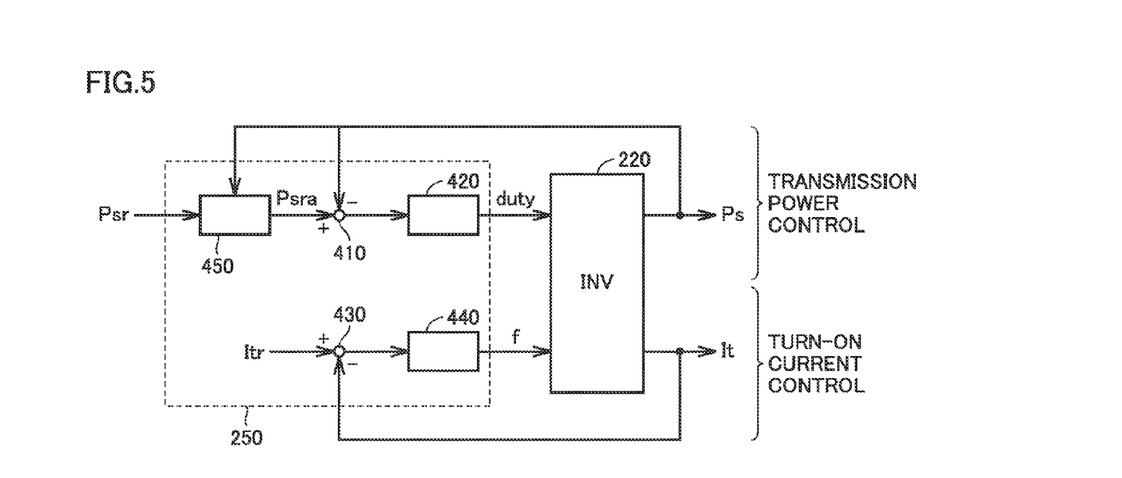
FIG. 5 is a control block diagram of transmission power control and turn-on current control.

FIG. 5 is a control block diagram of transmission power control and turn-on current control executed by power supply ECU 250. Referring to FIG. 5, power supply ECU 250 includes a target power correction unit 450, arithmetic units 410, 430 and controllers 420, 440. A feedback loop formed by target power correction unit 450, arithmetic unit 410, controller 420 and inverter 220 of a control target implements the transmission power control. On the other hand, a feedback loop formed by arithmetic unit 430, controller 440 and inverter 220 implements the turn-on current control.

Target power correction unit 450 receives target power Psr indicating the target value of transmission power and transmission power Ps indicating electric power to be transmitted by power transmission unit 240. Transmission power Ps may be calculated based on detected values of voltage sensor 270 and current sensor 272 (FIG. 1), for example. When transmission power Ps has exceeded the limit value (e.g., a value higher than target power by a predetermined ratio), target power correction unit 450 corrects target power Psr such that target power Psr is decreased depending on the excess amount, and outputs corrected target power Psra to arithmetic unit 410.

Figure 6:
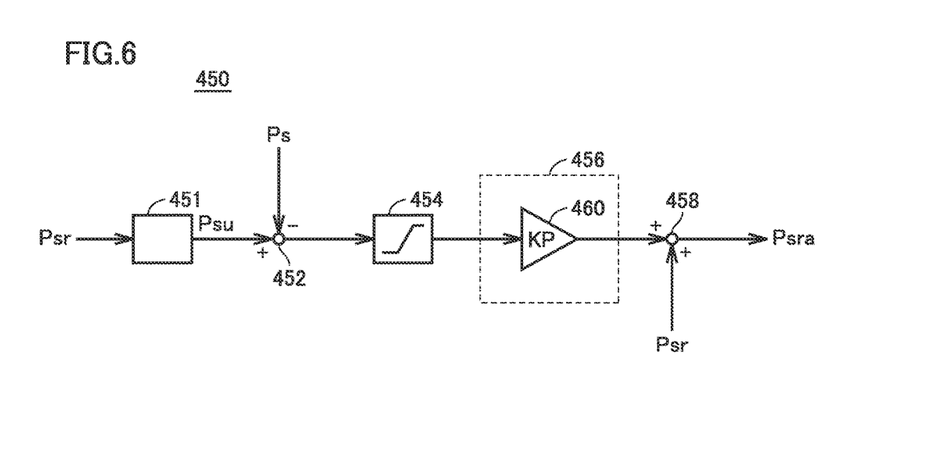
FIG. 6 is a detailed control block diagram of a target power correction unit.

FIG. 6 is a detailed control block diagram of target power correction unit 450 shown in FIG. 5. Referring to FIG. 6, target power correction unit 450 includes a limit value calculation unit 451, arithmetic units 452, 458, a filter unit 454, and a correction amount calculation unit 456.

Limit value calculation unit 451 calculates a limit value Psu of transmission power of power transmission unit 240 using target power Psr as an input. For example, limit value calculation unit 451 calculates a value higher than target power Psr by a predetermined ratio as limit value Psu.

Arithmetic unit 452 subtracts the value of transmission power Ps from limit value Psu, and outputs the calculated value to filter unit 454. When the calculated value received from arithmetic unit 452 is a negative value, filter unit 454 outputs it as it is, and when it is a positive value, outputs 0. That is, when transmission power Ps has exceeded limit value Psu, filter unit 454 outputs the excess amount as a negative value, and when transmission power Ps is smaller than limit value Psu, filter unit 454 outputs 0.

Upon receipt of the output of filter unit 454, correction amount calculation unit 456 calculates the correction amount of target power Psr. Specifically, correction amount calculation unit 456 is implemented by a proportional term 460. Proportional term 460 multiplies the output of filter unit 454 by a predetermined proportional gain KP, thereby calculating the correction amount (amount of decrease) of transmission power Ps proportional to the excess amount of transmission power Ps over limit value Psu. Since this proportional term 460 has a positive gain, the output of correction amount calculation unit 456 becomes a negative value proportional to the excess amount of transmission power Ps over limit value Psu.

Arithmetic unit 458 adds the output of correction amount calculation unit 456 to target power Psr, and outputs the calculated result as target power Psra. Since the output of correction amount calculation unit 456 is a negative value proportional to the excess amount of transmission power Ps over limit value Psu, target power Psra is a value smaller than target power Psr in proportion to the excess amount of transmission power Ps over limit value Psu.

Referring again to FIG. 5, arithmetic unit 410 subtracts a detected value of transmission power Ps from target power Psra corrected by correction amount calculation unit 456, and outputs the calculated value to controller 420. Controller 420 produces a duty command value for output voltage Vo of inverter 220 based on the difference between target power Psra and transmission power Ps. Controller 420 calculates a manipulated variable by, for example, executing PI control (proportional plus integral control) using the difference between target power Psra and transmission power Ps as an input, and uses the calculated manipulated variable as the duty command value. Accordingly, the duty of output voltage Vo is adjusted such that transmission power Ps approaches target power Psra, so that transmission power Ps is controlled to target power Psra.

In this embodiment, target power Psr shall be produced in power reception device 20 based on the difference between the target value and a detected value of received power. Therefore, in power transmission device 10, if transmission power Ps is decreased by decreasing target power in proportion to the excess amount of transmission power Ps over limit value Psu, received power is decreased in power reception device 20. As a result, target power Psr produced in power reception device 20 will be increased. Therefore, in this embodiment, when the target power is decreased in proportion to the excess amount of transmission power Ps over limit value Psu, an increase in target power Psr produced based on received power shall not be permitted, for example.

On the other hand, for the turn-on current control, arithmetic unit 430 subtracts a detected value of turn-on current It from a turn-on current target value Itr, and outputs the calculated value to controller 440. Turn-on current target value Itr is basically set at a value of less than or equal to 0 as described above. The detected value of turn-on current It is a detected value (instantaneous value) of current sensor 272 (FIG. 1) at the time when the rising of output voltage Vo is detected by voltage sensor 270 (FIG. 1).

Controller 440 produces a command value for the drive frequency (switching frequency) of inverter 220 based on the difference between turn-on current target value Itr and turn-on current It. Controller 440 calculates a manipulated variable by, for example, executing PI control using the difference between turn-on current target value Itr and turn-on current It as an input, and uses the calculated manipulated variable as the above-described frequency command value. Accordingly, the drive frequency of inverter 220 is adjusted such that turn-on current It approaches target value Itr, so that turn-on current It is controlled to target value Itr.

The turn-on current does not necessarily need to be controlled to the target value. For example, a limit value may be placed on the turn-on current instead of the target value of the turn-on current. In this case, the turn-on current is controlled so as not to exceed the limit value.

The transmission power control for adjusting the duty of output voltage Vo of inverter 220 and the turn-on current control for adjusting the drive frequency of inverter 220 interfere with each other. Turn-on current It may not be able to be controlled to target value Itr by the turn-on current control depending on the duty adjusted by the transmission power control.

Figure 7:
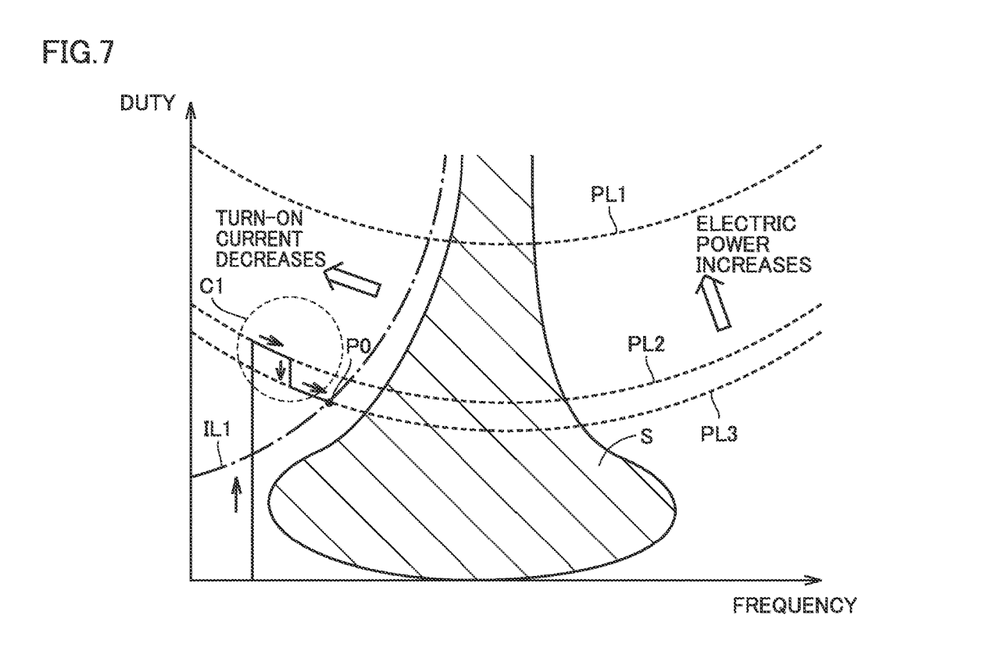
FIG. 7 illustrates an example of contour lines of transmission power and a turn-on current.

FIG. 7 illustrates an example of contour lines of transmission power Ps and turn-on current It. Referring to FIG. 7, the horizontal axis indicates the drive frequency (switching frequency) of inverter 220, and the vertical axis indicates the duty of output voltage Vo of inverter 220.

Each of lines PL1, PL2 and PL3 represents the contour line of transmission power Ps. The transmission power indicated by line PL1 is larger than the transmission power indicated by lines PL2 and PL3. The transmission power indicated by line PL2 is larger than the transmission power indicated by line PL3. As seen from the drawing, the duty that achieves certain transmission power indicates frequency dependence. A line IL1 indicates the contour line of a turn-on current. Line IL1 shown is the contour line on which the turn-on current has a predetermined value of less than or equal to 0 (shown here is a contour line on which the turn-on current becomes 0, as an example), and the turn-on current decreases (increases in the negative direction) as the duty increases and the frequency decreases.

A shaded area S is an area where a recovery current is produced in inverter 220. That is, at an operating point of inverter 220 included in area S, the turn-on current becomes larger than 0, and a recovery current is produced in inverter 220. Hereinafter, this area S will also be called a "forbidden band S". In this embodiment, the boundary of forbidden band S is not a line on which the turn-on current is 0, but a turn-on current of a small positive value shall be permitted.

An operating point P0 is a target value of the operating point of inverter 220. That is, when lines PL3 and IL1 indicate the target power and the turn-on current target value, respectively, the operating point of inverter 220 is controlled to operating point P0 which is the intersection of lines PL3 and IL1. The line indicated by the solid line shows transition of the operating point during execution of startup processing of inverter 220. In this example, the original target power is the electric power indicated by line PL2, and the target power is decreased to the electric power indicated by line PL3 since the transmission power exceeds the limit value when the operating point moves along line PL2. Forbidden band S tends to be expanded when the duty is small as shown in the drawing. Therefore, the gain of the transmission power control for adjusting the duty is set large, for example, such that the operating point promptly passes through forbidden band S at the startup of inverter 220 (at the rising of transmission power when the duty increases from 0). The operating point transitions as indicated by the solid line.

Figure 8:
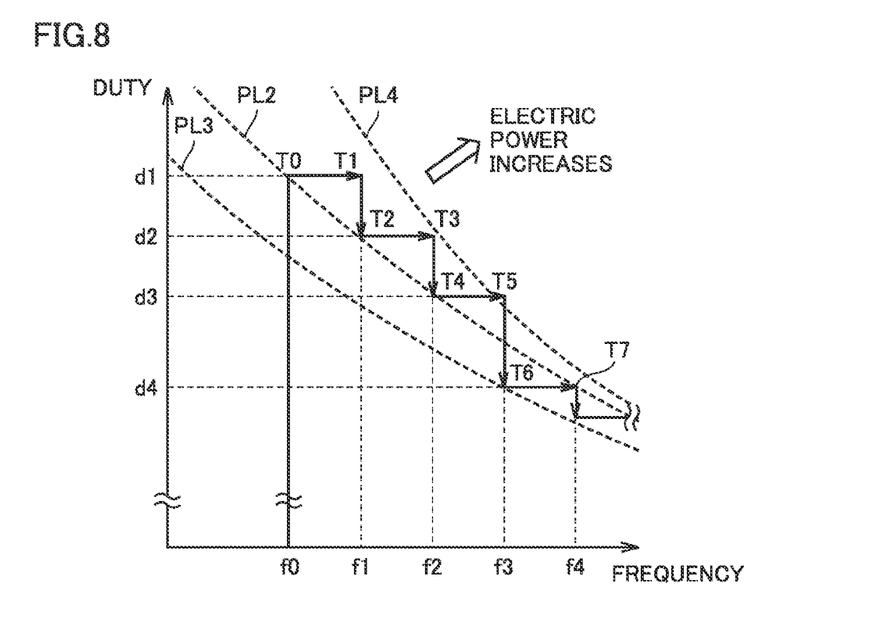
FIG. 8 illustrates a region C1 shown in FIG. 7 in more detail.

FIG. 8 illustrates region C1 shown in FIG. 7 in more detail. Referring to FIG. 8, line PL2 indicates the target power before correction, and line PL3 indicates the target power after correction. Line PL4 indicates transmission power larger than the transmission power indicated by line PL2, and herein shall indicate the limit value of transmission power. Although not illustrated in FIG. 7, the interval between the lines (PL2 to PL4) indicating the transmission power is narrower around frequency f3 than around frequency f0. That is, the sensitivity of changes in transmission power to changes in frequency is higher around frequency f3 than around frequency f0. Inverter 220 is started up with the drive frequency of inverter 220 being f0, and the operating point of inverter 220 transitions to T0 on line PL2 indicating target power.

Since operating point T0 is distant from the target value of the turn-on current (turn-on current value indicated by line IL1 (FIG. 7)), the drive frequency of inverter 220 transitions from f0 to f1 by the turn-on current control (operating point T1). Operating point T1 is an operating point in a range where transmission power is larger than the electric power indicated by line PL2. That is, as the operating point of inverter 220 transitions from T0 to T1, the transmission power increases. In this example, however, the transmission power at operating point T1 does not exceed the limit value (line PL4). Therefore, the target power of transmission power does not change from the electric power indicated by line PL2.

Since operating point T1 is distant from the target power, the duty of the output voltage of inverter 220 transitions to d2 by the transmission power control (operating point T2). Operating point T2 is an operating point on line PL2.

The drive frequency of inverter 220 transitions from f1 to f2 by the turn-on current control (operating point T3). Such an operation is repeated, and when the drive frequency of the inverter transitions from f2 to f3 so that the operating point reaches T5, the transmission power exceeds the limit value (line PL4). Since the contour lines of transmission power are concentrated around frequency f3 and changes in transmission power are large with respect to changes in drive frequency as described above, the transmission power exceeds the limit value when the drive frequency transitions from f2 to f3.

In the situation where the coupling coefficient between the power transmission coil and the power reception coil is small and the transmission power is small, the contour lines of transmission power tend to be concentrated. Therefore, the transmission power is likely to exceed the limit value in the situation where the coupling coefficient between the power transmission coil and the power reception coil is small and the transmission power is small.

If the transmission power at operating point T5 exceeds the limit value, the target power is corrected to a low value in proportion to the excess amount. For example, the target power is corrected from the electric power indicated by line PL2 to the electric power indicated by line PL3. Since operating point T5 is distant from the corrected target power (electric power indicated by line PL3), the duty of the output voltage of inverter 220 transitions to d4 by the transmission power control (operating point T6). Operating point T6 is an operating point on line PL3.

Thereafter, the drive frequency of inverter 220 transitions from f3 to f4 by the turn-on current control (operating point T7). Since the target power has been decreased, the transmission power at operating point T7 does not exceed the limit value (line PL4).

As described above, in this embodiment, when the target power is decreased since the transmission power has exceeded the limit value, the limit value is not changed, but this is not a limitation. For example, the limit value is usually set at a value higher than the target power by a first predetermined ratio, however, when target power Psr is decreased since transmission power Ps has exceeded the limit value, the limit value may be set at a value higher than the target power by a second predetermined ratio (>the first predetermined ratio).

Figure 9:
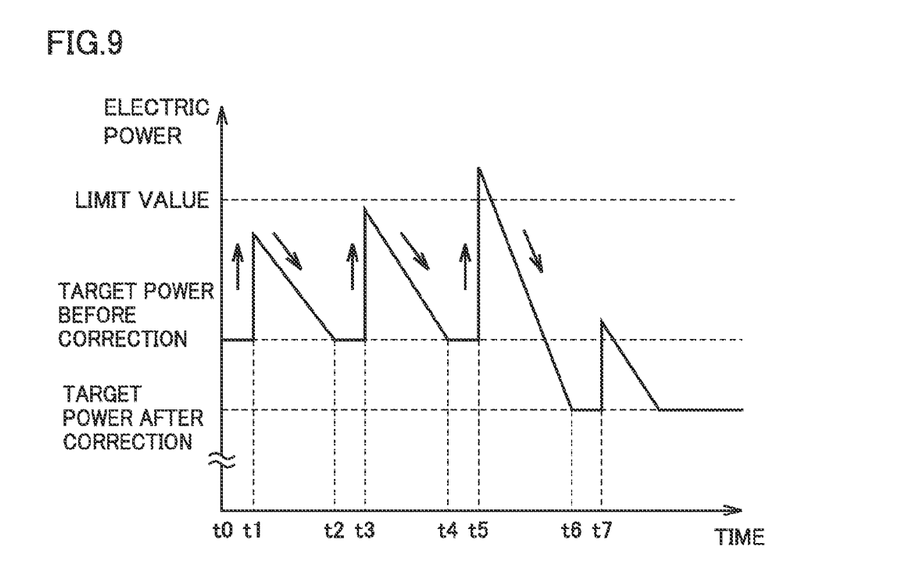
FIG. 9 illustrates an example of changes in transmission power caused by movement of an operating point of the inverter.

FIG. 9 illustrates an example of changes in transmission power when the operating point of inverter 220 transitions as shown in FIG. 8. Referring to FIG. 9 together with FIG. 8, it is supposed that the operating point of inverter 220 has reached T0 at a stage before time t1. At time t1, when the operating point of inverter 220 transitions from T0 to T1 by the turn-on current control (FIG. 8), the transmission power increases. Since the transmission power is larger than the target power, the transmission power is adjusted to the target power by the transmission power control (time t2). As a result, the operating point transitions to T2 (FIG. 8).

At time t3, when the operating point transitions from T2 to T3 by the turn-on current control (FIG. 8), the transmission power increases again to become closer to the limit value than at time t1. Then, the transmission power is adjusted to the target power by the transmission power control (time t4), and the operating point transitions to T4 (FIG. 8).

At time t5, if the operating point transitions from T4 to T5 by the turn-on current control (FIG. 8), the transmission power increases again to exceed the limit value. The target power of the transmission power is thus corrected. Then, the transmission power is adjusted to the corrected target power by the transmission power control (time t6). As a result, the operating point transitions from T5 to T6 (FIG. 8). At time t7, when the operating point transitions from T6 to T7 by the turn-on current control (FIG. 8), the transmission power increases again. However, since the target power has been decreased, the transmission power does not exceed the limit value at time t7.

Figure 10:
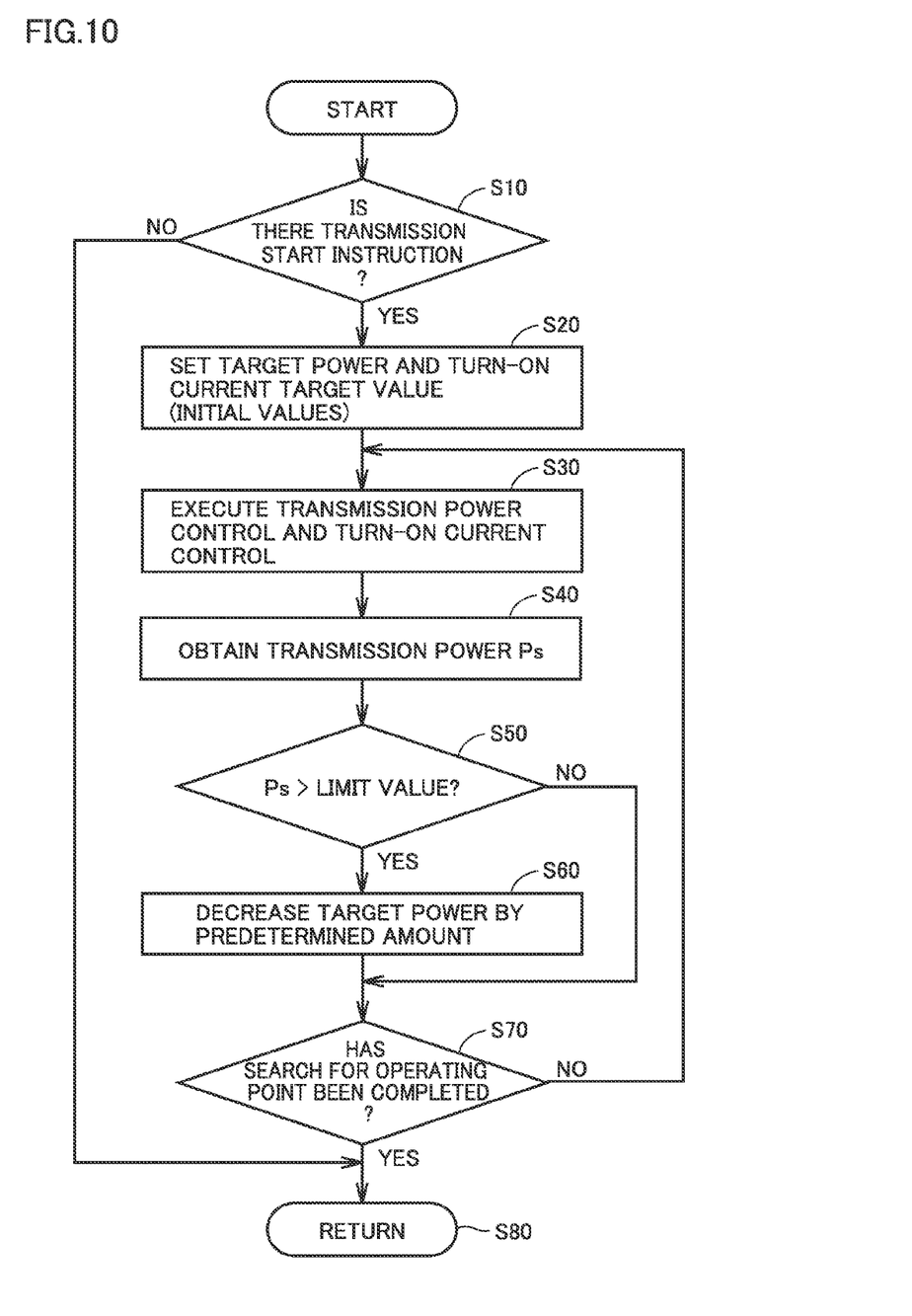
FIG. 10 is an explanatory flowchart of an inverter operating point search executed by a power supply ECU.

FIG. 10 is an explanatory flowchart of an operating point search for inverter 220 executed by power supply ECU 250 shown in FIG. 1. The process shown in this flowchart is invoked from a main routine and executed at predetermined intervals or when predetermined conditions are met.

Referring to FIG. 10, power supply ECU 250 determines whether or not there is a power transmission start instruction sent from power transmission device 10 to power reception device 20 (step S10). This power transmission start instruction may be issued based on a user instruction made in power transmission device 10 or power reception device 20, or may be issued following the arrival of a charging start time indicated by a timer or the like. When there is no power transmission start instruction (NO in step S10), power supply ECU 250 advances the process to step S80 without executing a series of subsequent operations.

When it is determined that there is a power transmission start instruction in step S10 (YES in step S10), power supply ECU 250 sets target power Psr for transmission power Ps and target value Itr for turn-on current It (initial values) (S20). While target power Psr is produced based on the power reception state of power reception device 20 as described above, it is set at a predetermined initial value at this time point when power transmission has not been started. As the initial value of turn-on current target value Itr, 0 is selected, for example.

When target power Psr and turn-on current target value Itr (initial values) are set, power supply ECU 250 executes the transmission power control and the turn-on current control (step S30). When power transmission from power transmission device 10 to power reception device 20 is started following the execution of the transmission power control, target power Psr is corrected in accordance with the power reception state of power reception device 20. As received power approaches a target value in power reception device 20, target power Psr is also stabilized.

When the transmission power control and the turn-on current control are executed, power supply ECU 250 obtains information on transmission power Ps transmitted from power transmission unit 240 (step S40). For example, power supply ECU 250 obtains detected values of voltage sensor 270 and current sensor 272 (FIG. 1), and calculates transmission power Ps. Power supply ECU 250 then determines whether or not obtained transmission power Ps has exceeded a predetermined limit value (e.g., a value higher than target power by a predetermined ratio) (step S50). As described above, transmission power Ps transmitted from power transmission unit 240 may exceed the limit value in the course of adjusting the drive frequency of inverter 220 to search for a desired inverter operating point (turn-on current target value) while controlling the transmission power to the target power by the transmission power control. The transmission power is likely to exceed the limit value particularly in the situation where the coupling coefficient between coil 242 of power transmission unit 240 and coil 312 of power reception unit 310 is small and the transmission power is small.

When it is determined that transmission power Ps has exceeded the limit value in step S50 (YES in step S50), power supply ECU 250 decreases the target power for the transmission power control by a predetermined amount (step S60). Specifically, in target power correction unit 450 shown in FIGS. 5 and 6, the amount proportional to the excess amount of transmission power Ps over limit value Psu (a value obtained by multiplying the excess amount by a predetermined proportional gain KP) is calculated as an amount of decrease of target power. When it is determined that transmission power Ps is less than or equal to the limit value in step S50 (NO in S50), the process proceeds into step S70 without the processing shown in step S60 being executed.

Power supply ECU 250 then determines whether or not the search for the operating point of inverter 220 has been completed (step S70). Basically, an operating point determined by the initial values of the target power and the turn-on current target value set in step S20 is a target operating point of the operating point search; however, if the target power has been decreased in step S60, an operating point determined by the decreased target power and the turn-on current target value shall be the target operating point.

When it is determined that the operating point of inverter 220 has reached a desired target operating point and the operating point search has been completed (YES in step S70), the process proceeds into step S80. On the other hand, when it is determined that the operating point search has not been completed in step S70 (NO in step S70), power supply ECU 250 returns the process to step S30, and the transmission power control and the turn-on current control are continuously executed.

If the transmission power exceeds the limit value even after the target power is corrected, the target power may be decreased further stepwise. The transmission power can thereby be prevented from exceeding the limit value with more reliability.

If the condition that the transmission power falls below the limit value continues for a predetermined time period after the target power is corrected, the target power may be returned to the target power before correction. The transmission power can thereby be controlled to original target power in such a case where the transmission power does not exceed the limit value.

As described above, in this embodiment, if the transmission power transmitted from power transmission unit 240 exceeds the limit value during adjustment of the drive frequency of inverter 220, the transmission power is suppressed by decreasing the target power. Therefore, according to this embodiment, the transmission power can be prevented from exceeding the limit value.

Moreover, according to this embodiment, since the target power is decreased in proportion to the excess amount of the transmission power over the limit value, the transmission power exceeding the limit value can be reduced quickly with a simple configuration.

Although in the above-described embodiment, correction amount calculation unit 456 (FIG. 6) of target power correction unit 450 shall be implemented by proportional term 460, it may further include an integral term.

Figure 11:
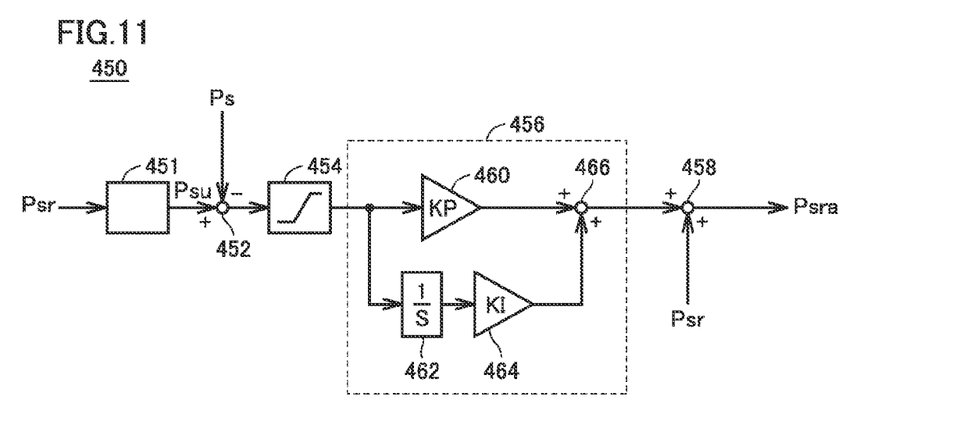
FIG. 11 is a control block diagram showing another configuration of the target power correction unit.

FIG. 11 is a control block diagram showing another configuration of target power correction unit 450. FIG. 11 corresponds to FIG. 6. Referring to FIG. 11, correction amount calculation unit 456 of target power correction unit 450 is configured to further include an integral term 462, an integral gain term 464 and an arithmetic unit 466 in addition to proportional term 460. Integral term 462 outputs an integrated value of the output of filter unit 454. Integral gain term 464 outputs the output of integral term 462 multiplied by a predetermined integration gain KI. Arithmetic unit 466 calculates a correction amount (amount of decrease) of target power Psr by adding the output of integral gain term 464 to the output of proportional term 460. Integral gain term 464 has a positive gain. Therefore, the output of integral gain term 464 is a negative value proportional to the integrated value of the excess amount of transmission power Ps over limit value Psu.

Arithmetic unit 458 adds the output of correction amount calculation unit 456 to target power Psr, and outputs the calculated result as target power Psra. Since the output of arithmetic unit 466 of correction amount calculation unit 456 is the sum of the negative value proportional to the excess amount of transmission power Ps over limit value Psu and the negative value proportional to the integrated value of the excess amount, target power Psra is a value smaller than target power Psr by the sum of the value proportional to the excess amount and the value proportional to the integrated value of the excess amount.

With this configuration, since target power correction unit 450 includes an integral term, transmission power Ps is controlled to limit value Psu if transmission power Ps reaches such a degree that exceeds limit value Psu. It is therefore possible to prevent transmission power Ps from exceeding limit value Psu with reliability and to minimize the amount of decrease of target power Psr.

The configuration of target power correction unit 450 is not limited to that shown in FIG. 6 or 11, but the correction amount of target power Psr may be calculated using a control technique other than the proportional control or proportional plus integral control.

In the above description, power supply ECU 250 corresponds to an embodiment of "a control unit" according to the present invention. The transmission power control corresponds to "a first control" according to the present invention, and the turn-on current control corresponds to "a second control" according to the present invention. Power transmission unit 240 corresponds to an embodiment of "a power transmission unit" according to the present invention, and inverter 220 corresponds to an embodiment of "a voltage-source inverter" according to the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A contactless power transmission device comprising:
a power transmission unit configured to transmit electric power to a power reception device in a contactless manner;
a voltage-source inverter configured to supply transmission power to the power transmission unit in accordance with a drive frequency; and
a control unit configured to control the inverter,
the control unit configured to execute:
a first control for controlling the transmission power to target power by adjusting a duty of an output voltage of the inverter; and
a second control for controlling a turn-on current by adjusting the drive frequency, the turn-on current indicating an output current of the inverter at a rising of the output voltage,
when the transmission power exceeds a limit value larger than the target power during adjustment of the drive frequency by the second control, the control unit being configured to decrease the target power in the first control.

2. The contactless power transmission device according to claim 1, wherein when the transmission power exceeds the limit value during adjustment of the drive frequency by the second control, the control unit is configured to decrease the target power by subtracting a correction amount proportional to an excess amount of the transmission power over the limit value from the target power.

3. The contactless power transmission device according to claim 2, wherein the control unit is configured to decrease the target power by further subtracting a correction amount proportional to an integrated value of the excess amount from the target power.

4. A power transfer system comprising:
a power transmission device; and
a power reception device,
the power transmission device including:
a power transmission unit configured to transmit electric power to the power reception device in a contactless manner;

a voltage-source inverter configured to supply transmission power to the power transmission unit in accordance with a drive frequency; and a control unit configured to control the inverter, the control unit configured to execute:

a first control for controlling the transmission power to target power by adjusting a duty of an output voltage of the inverter; and a second control for controlling a turn-on current by adjusting the drive frequency, the turn-on current indicating an output current of the inverter at a rising of the output voltage, when the transmission power exceeds a limit value larger than the target power during adjustment of the drive frequency by the second control, the control unit being configured to decrease the target power in the first control.

5. The power transfer system according to claim 4, wherein when the transmission power exceeds the limit value during adjustment of the drive frequency by the second control, the control unit is configured to decrease the target power by subtracting a correction amount proportional to an excess amount of the transmission power over the limit value from the target power.

6. The power transfer system according to claim 5, wherein the control unit is configured to decrease the target power by further subtracting a correction amount proportional to an integrated value of the excess amount from the target power.

* * * * *